No. 885,086. PATENTED APR. 21, 1908.
H. M. RUSSELL, Jr.
CLUTCH.
APPLICATION FILED NOV. 23, 1907.
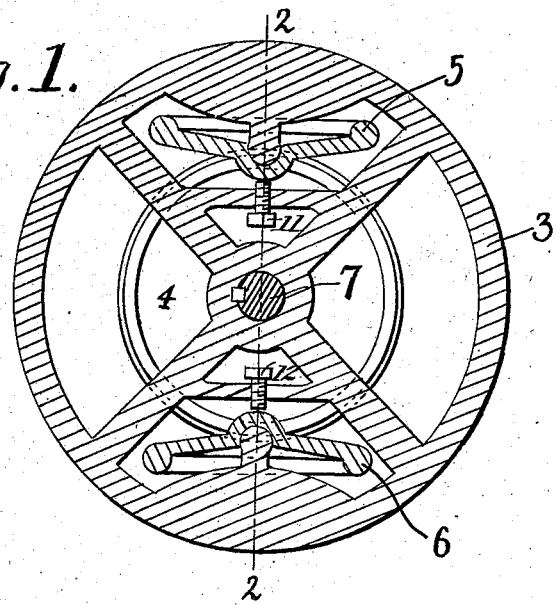
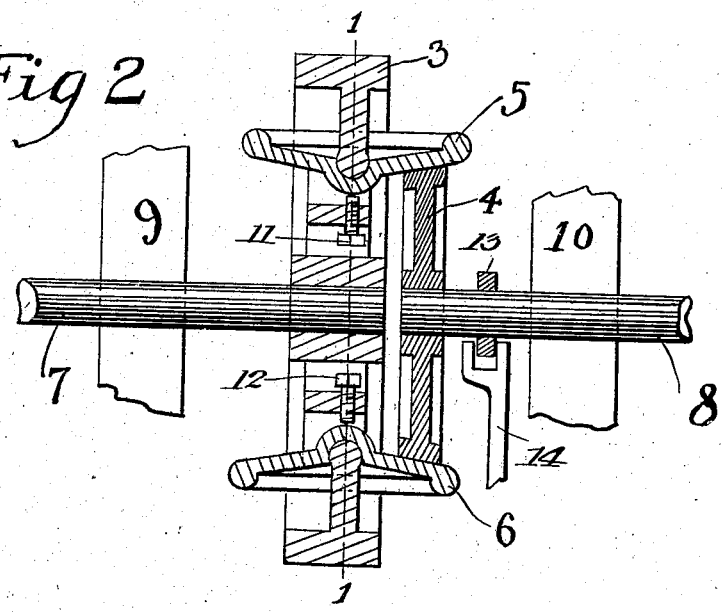
WITNESSES:
Maria L. Holliday.
Henry M. Russell.
INVENTOR.
Henry M. Russell Jr.

UNITED STATES PATENT OFFICE.

HENRY M. RUSSELL, JR., OF WHEELING, WEST VIRGINIA.

CLUTCH.

No. 885,086.      Specification of Letters Patent.      Patented April 21, 1908.

Application filed November 23, 1907. Serial No. 403,543.

*To all whom it may concern:*

Be it known that I, HENRY M. RUSSELL, Jr., of Wheeling, Ohio county, West Virginia, have invented a new and useful Improvement in Clutches, of which the following is a full, clear, and exact description, reference being had to the accompanying drawings, forming part of this specification, in which—

Figure 1 is a cross-section of the clutch along the line 1, 1 on Fig. 2; Fig. 2 is a longitudinal section along the line 2, 2 on Fig. 1.

My invention has relation to clutches used for various purposes and especially to clutches employed in the transmission of power from engines or other prime movers to other machinery and is especially adapted to the driving of machines in which the load is subject to wide and rapid variations, as for example, in automobiles.

One object of my invention is to provide a clutch capable of accelerating a driven member from rest to a speed nearly equal to that of the driving member without jar.

Another object of my invention is to provide a clutch in which the pressure at the friction contacts will increase as the slip increases, thereby tending to check the slip before it shall have become so great that the momentum of the driven member shall have been lost.

Another object of my invention is to provide a clutch which shall automatically regulate the load upon the engine.

Another object of my invention is to provide a clutch of few parts which requires no pressure from a spring or other outside source to keep the friction surfaces in contact.

My invention consists of a driving and a driven member attached respectively to alined shafts, the driving member carrying small flywheels which are free to rotate about axes perpendicular to the main axis of the device and so placed that the periphery of the driven member may be brought into contact with their inner faces.

My invention also consists in the novel construction, arrangement and combination of parts all as hereinafter described and pointed out in the appended claims.

Referring now to both Figs. 1 and 2, the numeral 3 designates the driving member which may be in the form of a flywheel. It is fastened rigidly to the shaft 7 which turns in the bearing 9.

4 is the driven member which may be in the form of a conical drum and which is attached rigidly to the shaft 8 which turns in the bearing 10.

5 and 6 are small flywheels free to rotate about axes perpendicular to the axes of the shaft 7 and 8 and also free to turn slightly in a plane passing through said shafts. This freedom is secured by using a socket bearing. Screws 11 and 12 retain the fly-wheels 5 and 6 in their places.

The numeral 14 designates a lever which engages a collar 13 on the shaft 8 and is adapted to give the shaft 8 a lateral movement.

The clutch acts as follows when the shaft 7 is driven by an engine or other source of power the flywheels 5 and 6 of course have an angular velocity about the axis of 7. If 4 be brought into contact with the inner faces of 5 and 6 which may be done by slipping the shaft 8 through the bearing 10, the friction between the surfaces will tend to make 5 and 6 rotate about axes perpendicular to the axis of 7. This will set up gyroscopic forces which will tend to make the edges of 5 and 6 nearest to 4 turn towards each other and this will increase the pressure on 4 which in turn will increase the velocity of 5 and 6. As the gyroscopic force increases the friction will increase and 4 will be accelerated. 4 will finally reach such a speed that the force due to friction will just equal the load. If the load increases 4 will be retarded, 5 and 6 will be accelerated and pressure will increase until 4 finds a new and slightly slower uniform speed.

It will be seen that the action is automatic and is very smooth and that the clutch will neither take hold nor let go rapidly unless 4 be pulled entirely out of contact by the operator.

So long as there is any resistance to the rotation of the shaft 8 this shaft must turn at a speed slower than the speed of 7, because as the speed of 8 approaches that of 7 the speed of the fly-wheels 5 and 6 about their spindles decreases and the pressure between 5 and 6 and 4 decreases. If the shaft 7 and 8 were to rotate at the same speed 5 and 6 would have no velocities about their spindles and so there would be no pressure between 5 and 6 and 4 and the clutch would transmit no power. It will be seen that this tendency for the pressure between the fly-wheels and the drum 4 to decrease as the speed of 8 approaches that of 7 has the effect of causing the power to be transmitted by an amount of friction which is never in excess of that actually required at the particular moment. In the present friction clutches the friction is usually, if not always, greatly in excess of what is required at the moment. This is necessary to prevent undue slipping and jerking. So with the present clutches any sudden overload will not cause slipping in the clutch until this excess of friction has been overcome. The result is that the overload, or a part of it, is thrown upon the motor or other driving mechanism. With my clutch, since there is no excess of friction the slightest overload will suffice to increase the rate of slipping in the clutch and the motor or other driving mechanism will be largely, if not completely, relieved of shocks.

It will be seen that the friction which causes the drive is not limited to the friction between fly-wheels 5 and 6 and their spindles. Since the line of contact between the fly-wheels 5 and 6 and the drum 4 does not pass through the intersection of the two axes of 5 and 6 with the axis of 7 and 8, it is evident that the parts of the drum in contact with 5 and 6 nearest their centers will tend to cause them to rotate at a speed faster than will the parts of the drum in contact with 5 and 6 farther from their centers. This will cause sliding friction between 5 and 6 and 4 which will have a tendency to cause the rotation of 4. By making the face of the drum 4 wide the sliding friction at this point can be increased so that it will do the greater part of the work of transmitting power and the friction between the fly-wheels and their spindles will have to do only a small part.

What I claim:—

1. In a clutch the combination of a driving member, a member to be driven alined therewith and a plurality of small flywheels attached to the driving member so as to be revoluble about axes perpendicular to the axis of the driving and driven members, and means for bringing the periphery of the said driven member into contact with the faces of the said small flywheels nearest the axis of the said driving and driven members.

2. In a clutch the combination of a driving member, a member to be driven alined therewith, a plurality of small flywheels and ball and socket joints connecting the said small flywheels to the said driving member in such positions that their inner faces shall come in contact with the periphery of the said member to be driven.

3. In a clutch the combination of a driving member, a driven member and a plurality of small flywheels revolubly attached to the driving member and adapted to be rotated about axes at right angles to the axis of the said driving member by contact with the rim of the said driven member and to vary the torque on the said driven member in accordance with the gyroscopic forces developed in the said small flywheels.

4. In a clutch the combination of a large flywheel having studs projecting within its rim, small flywheels adapted to turn loosely upon said studs and a drum so located as to have its rim in contact with the inner faces of said small flywheels, substantially as described.

5. In a clutch the combination of a driving member, a spindle projecting at right angles therefrom, a fly-wheel revolubly mounted on said spindle and a driven member, the said fly-wheel and the said driven member being in contact in such a manner that the friction at such contact shall tend to make the said fly-wheel rotated about the said spindle with an angular velocity proportional to the difference between the angular velocities of the driving and driven members respectively, substantially as described.

6. In a clutch the combination of a driving member, a driven member alined therewith, a fly-wheel mounted upon the said driving member in such a manner that it shall have freedom of rotation with respect to the said driving member about two axes neither of which shall be parallel to the axis of the said driving member, and so that the rotation of the said driving member about its axis shall be communicated to the said fly-wheel and means for bringing the periphery of the said driven member into contact with the face of the said fly-wheel at such a point that the friction at such contact shall be effective in conjunction with the motion imparted to the said fly-wheel by said driving member to rotate said fly-wheel about one of the first mentioned two axes and that the turning moment developed in the said fly-wheel by such motions shall operate to increase the friction at the said contact and also the friction between the said fly-wheel and the said driving member.

HENRY M. RUSSELL, Jr.

Witnesses:
HENRY M. RUSSELL,
MARIA L. HOLLIDAY.